UNITED STATES PATENT OFFICE.

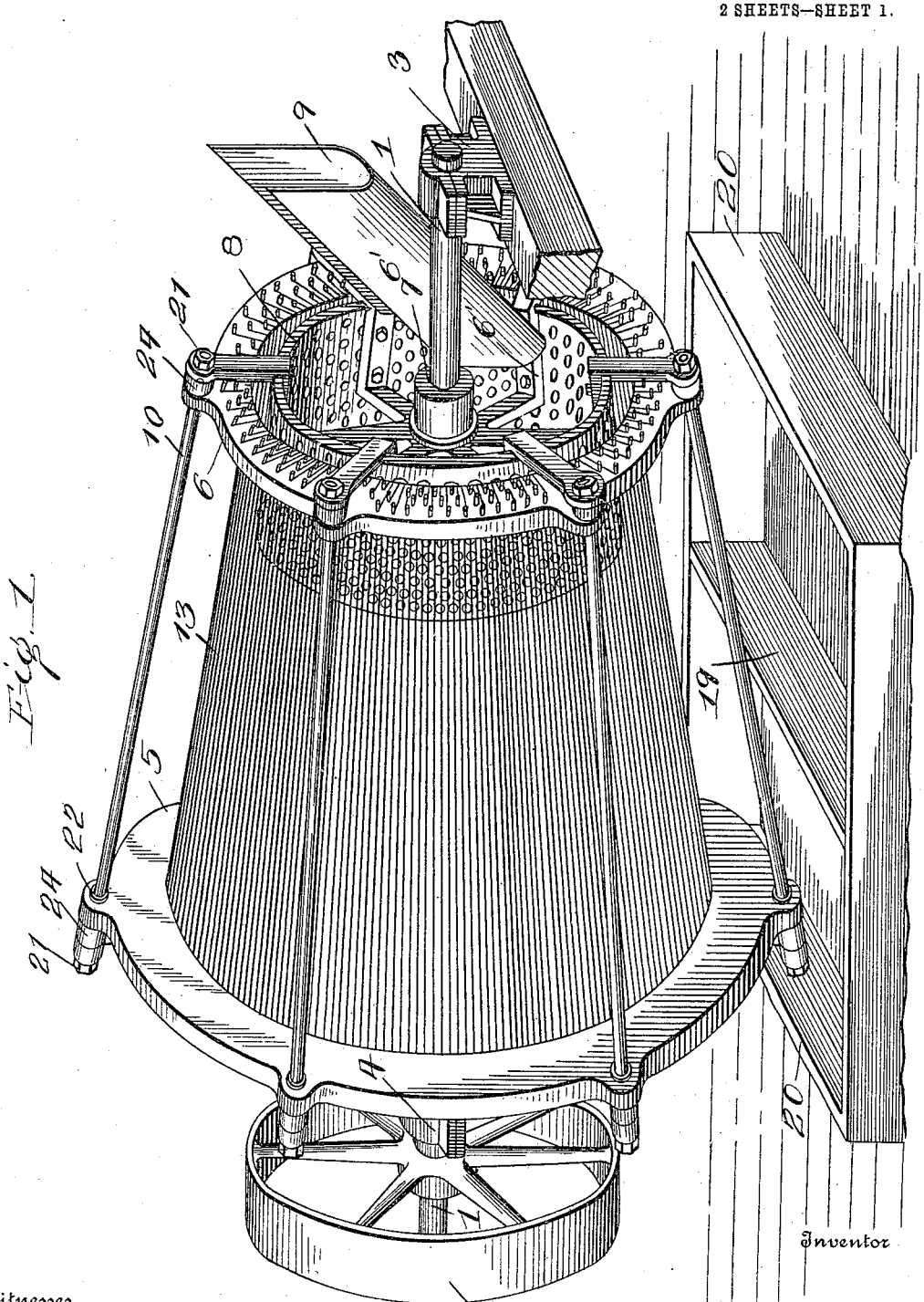

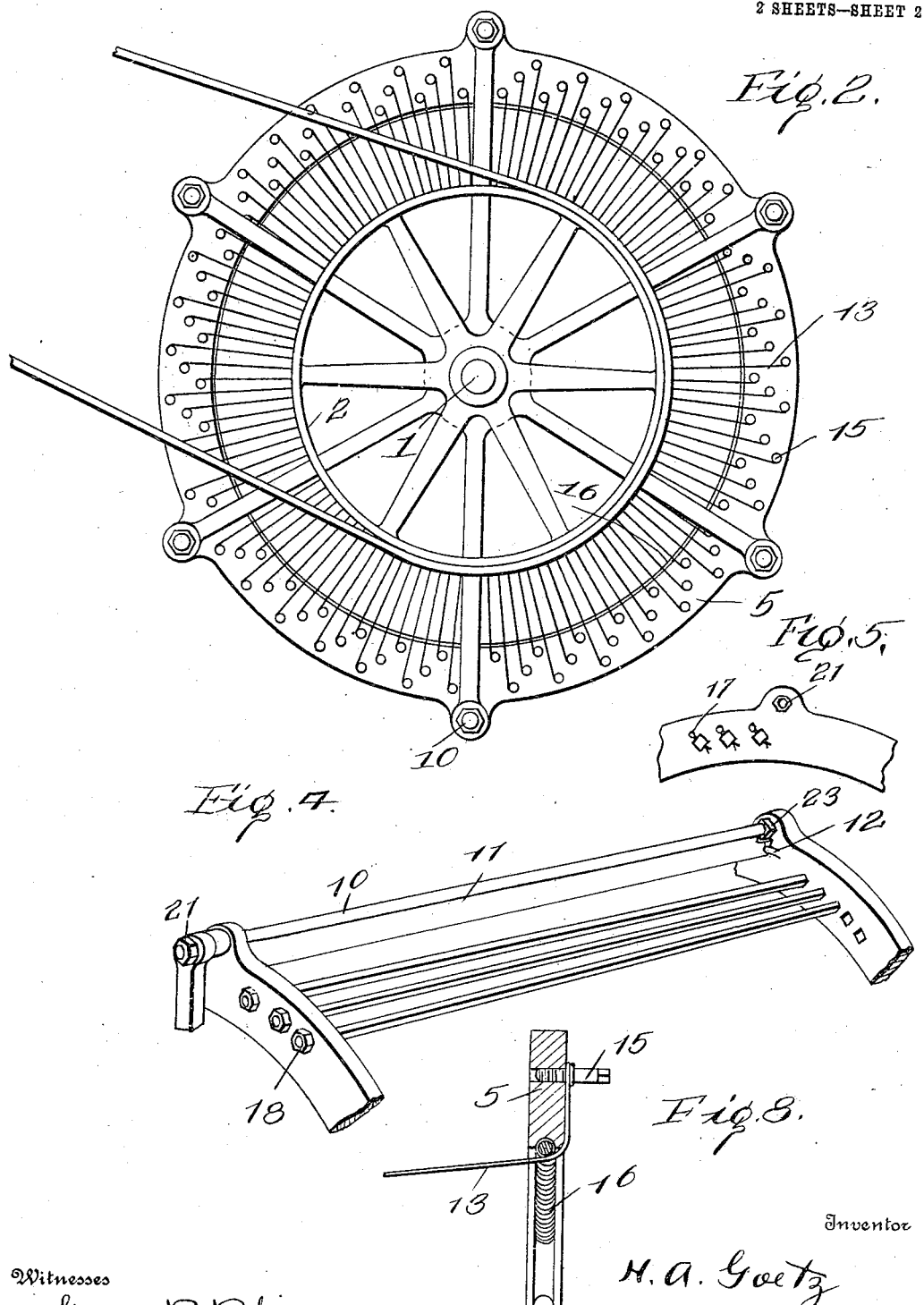

HENRY A. GOETZ, OF NEW ALBANY, INDIANA, ASSIGNOR TO AMERICAN PULVERIZER COMPANY, OF ST. LOUIS, MISSOURI, A CORPORATION OF MISSOURI.

SCREENING MECHANISM.

950,170.　　　　　Specification of Letters Patent.　　Patented Feb. 22, 1910.

Application filed October 30, 1908.　Serial No. 460,304.

*To all whom it may concern:*

Be it known that I, HENRY A. GOETZ, a citizen of the United States, residing at New Albany in the county of Floyd and State of Indiana, have invented certain new and useful Improvements in Screening Mechanism, of which the following is a specification, reference being had therein to the accompanying drawing.

This invention relates to screens and has for its object to provide a screening-mechanism which will not become clogged, and will separate the material into various grades of thickness and coarseness at a minimum cost and in a minimum space.

A screen embodying my invention is adapted to be used for sand, crushed rock or other similar materials.

Other objects of my invention will be readily apparent from a reading of the specification and claims in conjunction with the drawings.

In the drawings, Figure 1 is a perspective view of the screen as a whole. Fig. 2 is an end elevation showing the large end of the screen. Fig. 3 is a detail view of a portion of one of the end frames and the screen wires secured thereto. Fig. 4 is a fragmentary perspective view of a modified form of screen. Fig. 5 is an end view of the section of screen shown in Fig. 4.

While I have selected for the purpose of illustrating my invention a rotary screen, some of its features are equally applicable to screens of other sorts.

In the drawings, 1 indicates the shaft to which is keyed the driving pulley 2 and which is mounted in the bearings 3, 4. The circular end frames 5 and 6 are mounted upon the shaft by means of spiders, one longitudinally fixed near one end of the shaft and one slidably mounted near the other end. The spiders are off set from the faces of the rings by the washers 24. The arms 6—6 of one of these spiders which is at the feed-end of the screen are bent inwardly at right angles near their outer ends along lines parallel to the axis of the screen and are again given a right angle bend projecting inwardly to the spider hub 7. That portion of the spiders which is axially parallel with the shaft 1 supports the flat ring 8 which is designed to receive the material from the chute 9. The metal of this ring is sufficiently thick to withstand, without losing its shape, the weight of the fresh material and especially the larger particles thereof as they are received from the feed chute. By off-setting the arms of the spider, I am enabled to provide a free open ended space for the reception of the material, within which the chute 9 can project, without interfering with any of the rotating parts. This cylindrical shell or ring 8 is provided with perforations through which the material can pass, on to the screen proper. It is also open at its inner end so that material may readily pass therethrough on to the screen in small portions and through a distance so short that the larger particles of material will not distort or bend the elements of the screen.

The circular end frames 5—6 are united and accurately spaced apart by means of the spreader bolts 10, and the brace bars 11. Each of the bolts 10 passes through each of the circular frames and also serves to secure the arms of the supporting spiders to the frames, the spiders being held in place by the nuts 21. Each of these bolts is provided with a collar 22 near one end and with a nut 23 near the other end, which is threaded to engage with the nut. By adjusting the nuts 23 the distance between the frames may be varied, thereby changing the tension in the wires 13 hereinafter described. As an alternative construction which I prefer for screens of certain classes, I have shown in Fig 4 triangular bracing bars 11 mounted just within the bolts 10, and held against lateral displacement by the lugs 12 cast on the inner face of each end frame. These bars 11 reinforce the bolts 10 and prevent their buckling.

The circular frame at the feed-end of the machine is smaller than the one at the discharge end in its general dimensions and especially in the diameter of its central aperture. Wires 13 are secured by means of stationary pins to the outer vertical faces of the circular end frame at one end of the screen (the smaller end of the screen, as shown in the drawings), and by means of small rotatable pins 15 screw-threaded into the frame at the other end of the screen. These wires are accurately spaced by means of the bridge rods 16, which lie in a circumferential groove around the inner cylindrical face of each frame. These rods are threaded before being bent into hoop form, and the pitch of the thread determines the spacing of the wires which are tightly stretched over these bridge rods at each end of the screen.

In place of the screening wires which have been described rectangular rods may be used. These rectangular rods are mounted in square holes in the end frames, the holes being set obliquely with respect to radial lines, and the rods are secured by cotter pins 17 bearing against the outer end face of one of the circular frames and nuts 18 threaded upon the rounded portions at the other end of the rods, which bear against the outer end face of the other circular frame. By turning these nuts the bars can be placed under any desired tension. These rectangular rods when their edges have become worn can be given a quarter turn so that the new edges are presented to the adjacent rods and the grade of the material separated is relatively unaffected by the wear upon the bars.

The wires are designed for fine and light screening and the bar machines are adapted to the separation of heavier material.

Because of the difference in diameter of the end frames either the wires or the bars, as the case may be, diverge from one another, from end to end. This divergence may be slight in short screens which are designed to separate but one grade of material. The finer particles pass through between the wires or bars near the smaller end and being thus early removed from the mass of material, as it passes from end to end of the screen, they do not impede the coarser particles in their passage through the somewhat broader longitudinal interstices near the other end of the screen. The receiving ring 8 also assists in removing the finer particles and preventing them from causing the rest of the material to clog. The tension under which the bars or wires are placed causes them to vibrate under the weight of the moving material, which vibration acts to throw off sticky material and keep the screen clean. Furthermore, any particles which may become wedged between adjacent wires or rods will gradually be moved endwise of the screen by other particles and by the vibration generally of the machine, toward a position where the adjacent screening elements will be spaced sufficiently far apart to permit the passage of the clogged particles therethrough.

It will be observed that by using threaded rods to space the wires, not only is accurate spacing insured, but by merely changing the pitch of the thread any desired mesh may be secured. Any single wire or bar which may become broken or affected may be removed without disturbing the adjustment of the adjacent screening elements. The wedge shaped character of the brace castings 11 prevents material from resting thereupon, the knife-edge of the casting being turned toward the material.

I have shown beneath the central portion of the screen a partition 19 between the two bins 20, 20, to illustrate the method of use of a screen tapered in accordance with this invention, for the purpose of separating the material into different grades. When used for this purpose the taper should be rather greater and the screen somewhat longer than when it is designed to screen out but one grade of material.

In the larger size of screens it may be preferable to do away with the central shaft, in which case the screen is carried and revolved by means of trunnion wheels carrying the two ends upon which the wires or bars are fastened.

What I claim is:

1. In a screening mechanism, the combination of a pair of circular end frames, screening devices mounted under tension between the said end frames and elongated wedge-shaped spacing pieces with their edges directed toward the screening devices and mounted between the end frames and outside of the said screening devices.

2. In a screening mechanism, the combination of a pair of circular end frames, screening devices mounted between the said end frames under tension, and elongated wedge-shaped spacing pieces with their edges directed toward the screening devices, and mounted between the end frames outside of but adjacent to the said screening devices, and tension connecting members between the end frames, in addition to the screening devices.

3. In a screening mechanism, the combination of a pair of annular end frames, a shaft, spider arms mounted upon the shaft and secured to the annular end frames close to their outer peripheries, being spaced outwardly from the end faces of each frame so as to leave said faces relatively unobstructed, and elongated screening devices passing through the central openings of the end frames and secured at each end to the outer face of each of the end frames respectively, and means for adjusting the tension of said screening elements located on the outer end face of one of the end frames.

4. In a screening mechanism, the combination of a pair of annular end frames, a shaft, spider arms mounted upon the shaft and secured to the outer faces of the end frames near their outer peripheries, being spaced outwardly from the faces of each frame so as to leave the said faces relatively unobstructed, and screening wires each passing through the central openings of the end frames, and each passing outward at each end along the outer faces of one of the end frames, and means for securing each end of each wire to the outer faces of the end frames.

5. In a screening mechanism, the combination of a shaft, a pair of circular end frames, spacing rods between the end frames and having their ends passing through apertures in the end frames, washers on the spacing rods outside of the end frames, spiders mounted on the shaft, and connected to the spacing rods outside of the washers, and tension screening wires passing through the central openings of the end frames, and having their ends secured to the outer faces of the end frames.

6. In a screening mechanism, the combination of a pair of annular end frames, tension screening devices passing through the inner openings of the end frames and having their ends secured to the outer faces of the end frames and radially inward extending means for supporting the end frames without interfering with the spacing or operation of the screening elements or the securing of their ends to the outer faces of the end frames.

7. In a screening mechanism, a pair of annular end frames, tension screening devices passing through the inner openings of the end frames, and having their ends secured to the outer faces of the end frames, and means for supporting the end frames without interfering with the spacing or operation of the screening elements or the securing of their ends to the outer faces of the end frames.

In testimony whereof I affix my signature, in presence of two witnesses.

HENRY A. GOETZ.

Witnesses:
   Jos. KESHNER,
   WALTER V. BULLEIT.